N. HOLSTEIN.
ICE GRIP.
APPLICATION FILED MAY 29, 1915.
1,203,339.
Patented Oct. 31, 1916.
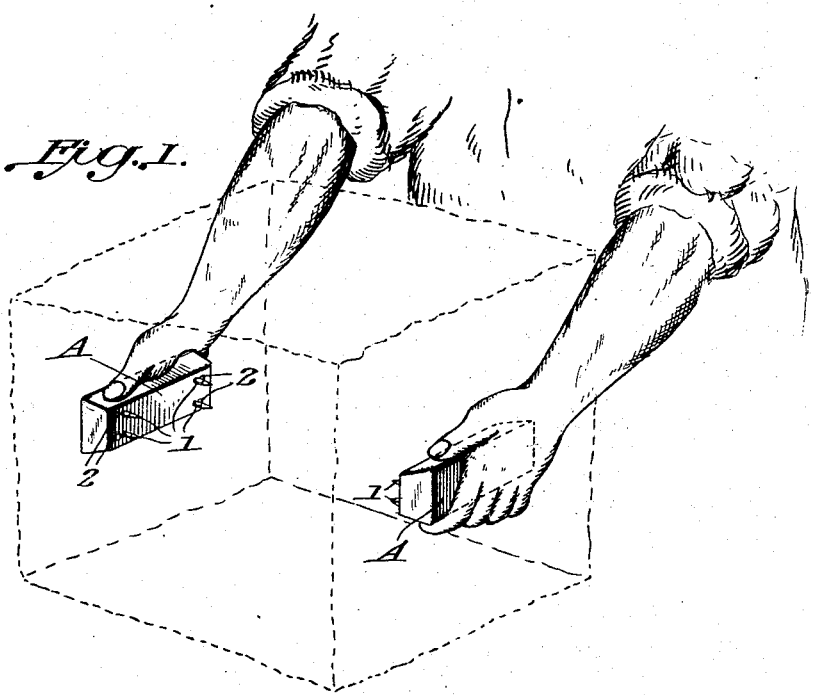
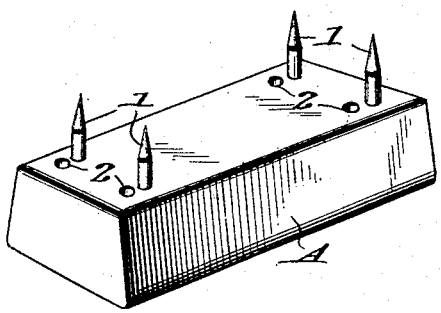
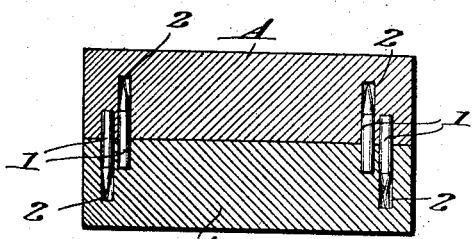
Inventor:
Nathan Holstein
By Vernon E. Hodges
his Atty.

UNITED STATES PATENT OFFICE.

NATHAN HOLSTEIN, OF NEW YORK, N. Y.

ICE-GRIP.

1,203,339.    Specification of Letters Patent.    Patented Oct. 31, 1916.

Application filed May 29, 1915. Serial No. 31,235.

*To all whom it may concern:*

Be it known that I, NATHAN HOLSTEIN, a citizen of the United States, residing at New York city, in the county of New York and State of New York, have invented certain new and useful Improvements in Ice-Grips, of which the following is a specification.

My invention relates to an improvement in ice-grips, the purpose of the invention being to facilitate the handling of ice, especially for domestic use in removing the ice from a dumbwaiter and putting it into a refrigerator, or in handling a block of ice generally.

It consists in two grips having teeth adapted to be forced into the ice from opposite sides, thus affording handles to facilitate in moving and lifting the cake of ice, which otherwise is not only cold but slippery and difficult to lift or move from place to place.

In the accompanying drawings:—Figure 1 is a view in perspective; and Fig. 2 is a sectional view showing the grips together.

A, is the handle made of wood, metal, or other material and fashioned into convenient shape to grip in the hand. Several teeth or prongs 1, 1, are provided on the inner face, four being shown in the drawings, although any number might be employed. These are sharpened at the end to make it easy to force them into the ice. Holes 2, 2, are provided in the opposite faces to receive these teeth as shown in Fig. 2, when the device is not in use, they being held together by frictional engagement of the teeth within the holes. It is understood these are always used in pairs, one grip being held in each hand with the chunk of ice between them, the teeth penetrating from opposite sides and absolutely preventing the ice slipping from the hands, and making a temporary but firm handle as it were for the lifting and holding of a chunk of ice, no matter how large or small, thus not only making it easy to hold the cake of ice, but also avoiding the necessity of touching it, and thus chilling the hands.

Obviously the form and material of the device might be changed, the number of teeth might be varied, etc., without departing from the real spirit and scope of my invention, and hence I do not wish to limit myself to the exact construction illustrated.

I claim:

1. An ice grip comprising two members wholly independent of each other, which are in the form of bodies with teeth extending therefrom, whereby when each member is gripped in a hand of the operator the ice may be held by and between the teeth of said members.

2. Ice-grips comprising handles, and teeth, the inner face of each handle having holes of a size and depth to receive the teeth of the other grip, so that the two may be frictionally held together and the sharp points protected when not in use.

In testimony whereof I affix my signature, in the presence of two witnesses.

NATHAN HOLSTEIN.

Witnesses:
 JACOB ANSBACHER,
 MINNIE GREENBERG.

Copies of this patent may be obtained for five cents each, by addressing the "Commissioner of Patents, Washington, D. C."